United States Patent
Chazot et al.

(10) Patent No.: US 10,521,373 B2
(45) Date of Patent: *Dec. 31, 2019

(54) INPUT DEVICE WITH MULTI-HOST SWITCHING

(71) Applicant: Logitech Europe S.A., Lausanne (CH)

(72) Inventors: Philippe Chazot, Saint-Jorioz (FR);
Laurent Mealares, St-Sulpice (CH);
Jiri Holzbecher, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,849

(22) Filed: Jan. 28, 2019

(65) Prior Publication Data

US 2019/0188166 A1   Jun. 20, 2019

Related U.S. Application Data

(63) Continuation of application No. 14/884,381, filed on Oct. 15, 2015, now Pat. No. 10,191,869.
(Continued)

(51) Int. Cl.
| | |
|---|---|
| *G06F 3/01* | (2006.01) |
| *G06F 13/20* | (2006.01) |
| *G06F 13/40* | (2006.01) |
| *G06F 13/42* | (2006.01) |
| *G06F 13/10* | (2006.01) |
| *G06F 3/038* | (2013.01) |
| *G06F 3/023* | (2006.01) |

(52) U.S. Cl.
CPC ............... *G06F 13/20* (2013.01); *G06F 3/01* (2013.01); *G06F 3/023* (2013.01); *G06F 3/038* (2013.01); *G06F 13/102* (2013.01); *G06F 13/4068* (2013.01); *G06F 13/42* (2013.01); *G06F 2203/0381* (2013.01); *G06F 2203/0384* (2013.01)

(58) Field of Classification Search
CPC ..................................... G06F 3/01; G06F 3/02
See application file for complete search history.

(56) References Cited

U.S. PATENT DOCUMENTS

| | | |
|---|---|---|
| 10,191,869 B2 | 1/2019 | Chazot et al. |
| 2002/0105553 A1 | 8/2002 | Segre |
| | (Continued) | |

FOREIGN PATENT DOCUMENTS

| | | |
|---|---|---|
| CN | 103376901 A | 10/2013 |
| CN | 105677049 A | 6/2016 |
| | (Continued) | |

OTHER PUBLICATIONS

U.S. Appl. No. 14/884,381, "Final Office Action", dated Apr. 30, 2018, 20 pages.
(Continued)

*Primary Examiner* — Farley Abad
(74) *Attorney, Agent, or Firm* — Kilpatrick Townsend & Stockton LLP

(57) ABSTRACT

Embodiments of the present invention provide a method and system of switching a wireless connection between a plurality of input devices and a first host device to at least a second host device. Embodiments of the invention are directed to systems and methods for switching multiple, independently connected data input devices from a first host computing device to a second host computing device together based on a single command or operation.

11 Claims, 13 Drawing Sheets

Related U.S. Application Data

(60) Provisional application No. 62/066,023, filed on Oct. 20, 2014.

(56) References Cited

U.S. PATENT DOCUMENTS

| | | |
|---|---|---|
| 2005/0065768 A1 | 3/2005 | Karaoguz et al. |
| 2009/0024847 A1 | 1/2009 | Sun |
| 2012/0083208 A1 | 4/2012 | Giles et al. |
| 2015/0173108 A1 | 6/2015 | Thangella |
| 2016/0110302 A1 | 4/2016 | Chazot et al. |

FOREIGN PATENT DOCUMENTS

| | | |
|---|---|---|
| CN | 105677049 B | 4/2019 |
| DE | 102015117810 A1 | 4/2016 |

OTHER PUBLICATIONS

U.S. Appl. No. 14/884,381, "Non-Final Office Action", dated Oct. 16, 2017, 17 pages.
U.S. Appl. No. 14/884,381, "Notice of Allowance", dated Sep. 12, 2018, 9 pages.
CN201510685185.9, "Notice of Decision to Grant", dated Dec. 29, 2018, 4 pages.
CN201510685185.9, "Office Action", dated Dec. 11, 2017, 14 pages.
CN201510685185.9, "Office Action", dated Jul. 6, 2018, 15 pages.

INPUT DEVICE WITH MULTI-HOST SWITCHING

CROSS REFERENCES TO RELATED APPLICATIONS

This application is a continuation of U.S. application Ser. No. 14/884,381, filed on Oct. 15, 2015, and claims the benefit of priority of U.S. Provisional Patent Application No. 62/066,023, filed on Oct. 20, 2014, which are herein incorporated by reference in their entirety for all purposes.

BACKGROUND

Physical input devices (e.g., keyboard, mouse, stylus) are commonly used by users to perform actions (e.g., keystrokes, mouse movements). These actions may then be translated into data that can be provided to a computing device to represent human interactions with the computing device. Today, it is common for a user to have a multitude of computing devices that they use on a regular basis, and even simultaneously. For example, a single user may have a desktop computer, a laptop computer, a smart phone, and a tablet computer.

As a result, users may often regularly interface with more than one of these computing devices. For example, a user may be using a laptop computer for business purposes and a tablet computer for entertainment purposes. It would be cumbersome for a user to carry separate input devices for each computing device and physically move from one input device connected to one computing device to second input device connected to a second host computing device in order to utilize both computing devices. Some alternatives allow reusing a single input device for data entry to multiple computing devices. However, these solutions are not without their drawbacks.

One significant drawback with prior solutions is how the process of switching multiple data input devices from a first host computing device to a second host computing device is done. In some prior solutions, in order to switch both the keyboard device and the mouse device to a second host computing device, the user would have to perform two separate actions, which can be detrimental to the user experience. For example, in prior solutions, both the keyboard device and the mouse device are independently paired with each of the two or more host computing devices. When the user wants to switch from using a first host computing device to a second host computing device, the user would have to change the pairing for each of the keyboard device and the mouse device, individually.

Based on the foregoing, there is a need in the art for improved methods and systems to more efficiently switch connections pairings input devices with multiple computing devices.

BRIEF SUMMARY

The present invention relates generally to input devices, such as human interface devices, configured for use with electronics or computing devices. More specifically, the present invention relates to methods and systems for using a combination of input devices (e.g., a keyboard device and a mouse device) with multiple host computing devices, and efficiently and automatically switching the combination of input devices between the multiple host computing devices while minimizing the amount of user interaction required to effect such a switching. In particular, embodiments of the invention are generally directed to systems and methods for switching multiple, independently connected data input devices from a first host computing device to a second host computing device together based on a single command or operation.

Embodiments of the present invention provide a method of establishing a wireless connection between a data input device and a host computing device. The method comprises establishing a first wireless connection between a first data input device and a first host computing device from the plurality of host computing devices, and a second wireless connection between a second data input device and the first host computing device. The method further comprises receiving an indication from a first data input device to switch the first wireless connection from the first host computing device to a second host computing device from the plurality of host computing devices. A command is then sent to the second data input device to switch the second wireless connection from the first host computing device to the second host computing device.

In some embodiments, the indication from the first data input device is one of a user selection made through an interaction with the first data input device, through a user input detected by a sensor device, and a command from a host computing device. In some embodiments, the indication from the first data input device is a movement of a cursor associated with the first data input device displayed on a display of one of the plurality of host computing devices to a predetermined location on the display.

In some embodiments, sending the command to the second data input device to switch the second wireless connection from the first host computing device to the second host computing device further comprises determining that the first data input device and the second data input device are capable of connecting to the second host computing device, and receiving an indication of the result of the determination. When the first data input device and the second data input device are capable of connecting to the second host computing device, the method further comprises initiating a connection between the first data input device and the second data input device with the second host computing device.

In some embodiments, determining that the first data input device and the second data input device are capable of connecting to the second host computing device further comprises determining that pairing profiles exist for each wireless connection between the second host computing device with the first data input device and the second data input device.

In some embodiments, the first data input device and the second data input device are associated in a subset of the plurality of data input devices, wherein when the indication from the first data input device is received, the subset of the plurality of data input devices switches their wireless connections from the first host computing device to the second host computing device.

In some embodiments, the first data input device and the second data input device are connected by a third wireless connection. In such embodiments, the first data input device and the second data input device are configured to send switching commands to each other via the third wireless connection.

In some embodiments, one or more of the plurality of data input devices are configured to maintain wireless connections with a plurality of host computing devices simultaneously.

In some embodiments, the data communications connection is a Bluetooth® Smart communications protocol.

In some embodiments, the first data input device is a keyboard and the second data input device is a mouse.

In some embodiments, when one or more of the first data input device and the second data input device are unable to connect to one of the plurality of host computing devices, the method further comprises providing a notification to the user.

Additional embodiments of the present invention provide a system comprising a plurality of host computing devices, and a plurality of data input devices, wherein the plurality of data input devices are connected to one of the plurality of host computing devices using a method. In some embodiments, the method comprises establishing a wireless connection between a data input device and a host computing device. The method may further comprise establishing a first wireless connection between a first data input device and a first host computing device from the plurality of host computing devices, and a second wireless connection between a second data input device and the first host computing device. The method further comprises receiving an indication from a first data input device to switch the first wireless connection from the first host computing device to a second host computing device from the plurality of host computing devices. A command is then sent to the second data input device to switch the second wireless connection from the first host computing device to the second host computing device.

In some embodiments, switching software may be installed on each host computing device. The active host computing device (e.g., the host computing device currently connected to the input devices) detects that the user wants to switch their connection to a second host computing device. The switching software sends a command to each input device to switch to the second host computing device. Alternately, the switching software can send a command to a first input device, and the first input device can relay the command to a second input device. Alternately, the second host computing device could send a request to the active host computing device to initiate the switching process.

In other embodiments, there may be no switching software installed on the host computing devices. In such embodiments, a switching input is provided by the user to one of the input devices. The first input device switches from the active host computing device to the second host computing device, and may then send a command to the other input device to similarly switch from the active host computing device to the second host computing device.

In other embodiments, a gateway device may be connected to the active host computing device, either physically engaged with the active host computing device or as a standalone gateway device connected via a wireless connection. For example, a USB dongle can have a Bluetooth® receiver for converting between a Bluetooth® channel used to communicate with the input devices and the computer device's USB input. In other embodiments, the gateway device may use other suitable communications protocols other than USB. The gateway device may receive the switch command either from the active host computing device, or from one of the input devices. The gateway device may either relay the switch command from one input device to another input device, or send an active host switch command to all input devices.

Additional embodiments of the present invention provide a system comprising a plurality of host computing devices, a plurality of data input devices, and a gateway device. In some embodiments, the gateway device may be configured to send data between the plurality of host computing devices and the plurality of data input devices. The gateway device may be configured to switch a wireless connection between the plurality of data input devices and the plurality of host computing devices using a method comprising establishing the wireless connection between the plurality of data input devices and a first host computing device from the plurality of host computing devices. The method further comprises receiving an indication from a first data input device from the plurality of data input devices to switch the wireless connection from the first host computing device to a second host computing device from the plurality of host computing devices. The method further comprises sending, by the gateway device, commands to each additional data input device of the plurality of data input devices instructing each of the additional data input devices to independently connect to the second host computing device.

In some embodiments, the method further comprises receiving an indication from the first data input device from the plurality of data input devices to switch the wireless connection from the second host computing device to a third host computing device from the plurality of host computing devices. The method further comprises sending, by the gateway device, commands to each additional data input device of the plurality of data input devices instructing each of the additional data input devices to independently connect to the third host computing device.

In some embodiments, the gateway device is a dongle device physically engaged with at least one of the plurality of host computing devices and the plurality of data input devices. In some embodiments, the gateway device may be wirelessly connected to the other host computing devices and data input devices to which it is not physically engaged.

In some embodiments, the gateway device is a dongle device connected to the plurality of host computing devices and the plurality of data input devices via a wireless data communications connection.

These and other embodiments of the invention along with many of its advantages and features are described in more detail in conjunction with the text below and attached figures.

DETAILED DESCRIPTION

Embodiments of the invention are generally directed to systems and methods for switching the data connections of multiple data input devices from a first host computing device to a second host computing device together based on a single command or operation.

Embodiments are described with respect to a multi-modal wireless input device in the form of a keyboard device and a mouse input device. However, embodiments of the invention are not limited to input devices in the form of a keyboard device and a mouse input device. Additional embodiments contemplate input devices having other forms, including, but not limited to, a touchpad, stylus, gamepad, steering wheel, presentation pointer, trackball, joystick, headset, and remote control.

I. Exemplary Systems

Figure 1:
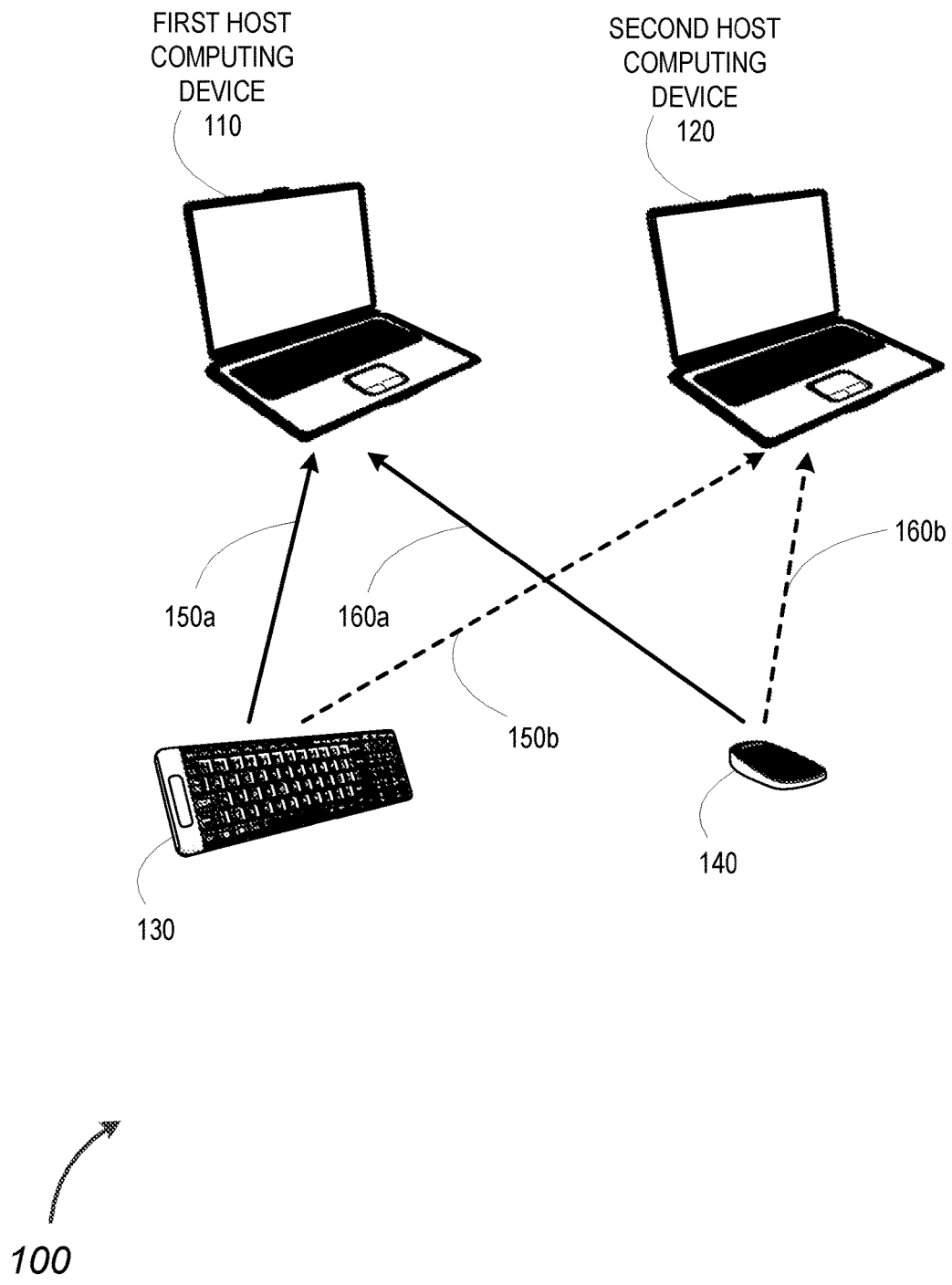
FIG. 1 is a diagram of a computer system according to an embodiment of the present invention.

FIG. 1 is a diagram of a system 100 according to an embodiment of the present invention. Computer system 100 includes a first host computing device 110, a second host computing device 120, a keyboard device 130, and a mouse input device 140. In some embodiments, the mouse input device 140 may be a multi-modal mouse input device. In some embodiments, the input device may refer to either or both the keyboard device 130 and a mouse input device 140 or any other input device. In some embodiments, the input devices may also be referred to as a data input device.

For simplicity of illustration, a certain number of components are shown in FIG. 1. It is understood, however, that embodiments of the invention may include more than one of each component. For example, the keyboard device 130 and the mouse input device 140 may be able to connect with two or more host computing devices. In some embodiments, there may be additional input devices, such as a joystick or stylus. In addition, some embodiments of the invention may include fewer than all of the components shown in FIG. 1.

For system 100, the keyboard device 130 and the mouse input device 140 may be configured to control various aspects of the first host computing device 110 and the second host computing device 120. The first host computing device 110 and the second host computing device 120 may each include a non-transitory computer-readable storage medium (not shown) that is configured to store computer code, such as keyboard driver software, mouse input device driver software, and the like, where the computer code is executable by a processor (not shown) of the host computing device to affect control of the host computing device by the keyboard device 130 and the mouse input device 140. In some embodiments, the keyboard device 130 and the mouse input device 140 may be hardwired, wirelessly coupled, or integrated into the host computing devices (e.g., a touchpad region on the host computing device).

As depicted in FIG. 1, the first host computing device 110 and the second host computing device 120 are represented as laptop computers. However, the keyboard device 130 and the mouse input device 140 may wirelessly connect to and provide input to other types of computing devices (e.g., a smart phone and/or a tablet computer). The first host computing device 110 and the second host computing device 120 may be referred to, collectively or individually, as host computing devices. Other examples of host computing devices may include a smart phone and a tablet computer. Alternately, the invention can be used with any other computing devices, such as a desktop computer, laptop computer, server, set-top box, smart TV, smart appliance, remote control hub, or any other device with processing circuitry. In embodiments of the invention, the first computer device 110 and the second host computing device 120 may be any combination of the above-noted computing devices, as well as other similar or comparable computing devices. In addition to providing data input to a computer system 100, the mouse input device 140 can be utilized in any number of configurations and systems (e.g., personal computers, servers, terminals) as would be appreciated by one of ordinary skill in the art.

FIG. 1 illustrates the keyboard device 130 and mouse input device 140 with pairings to the first host computing device 110 over wireless connections 150a and 160a, respectively. FIG. 1 also illustrates the keyboard device 130 and mouse input device 140 with pairings to the second host computing device 120 over wireless connections 150b and 160b, respectively. In some embodiments, the keyboard device 130 and mouse input device 140 may maintain two or more connections simultaneously. In other embodiments, the keyboard device 130 and mouse input device 140 may maintain a single connection. In some embodiments, the wireless connections may use a Bluetooth® connection. Bluetooth® is a wireless technology standard for exchanging data over short distances between devices that may be either fixed or mobile devices. Some embodiments can include other means for providing short-range contact or contactless communications capability, such as RF, RFID, infra-red, or other data transfer capability that can be used to exchange data between the keyboard device 130, the mouse input device 140, and the host computing devices 110 and 120. In other embodiments, communications between the keyboard device 130 and the host computing devices 110 and 120 may be conducted using a communications protocol. For example, the communications protocol may be operating at 2.4 GHz or 5.8 GHz.

Figure 2:
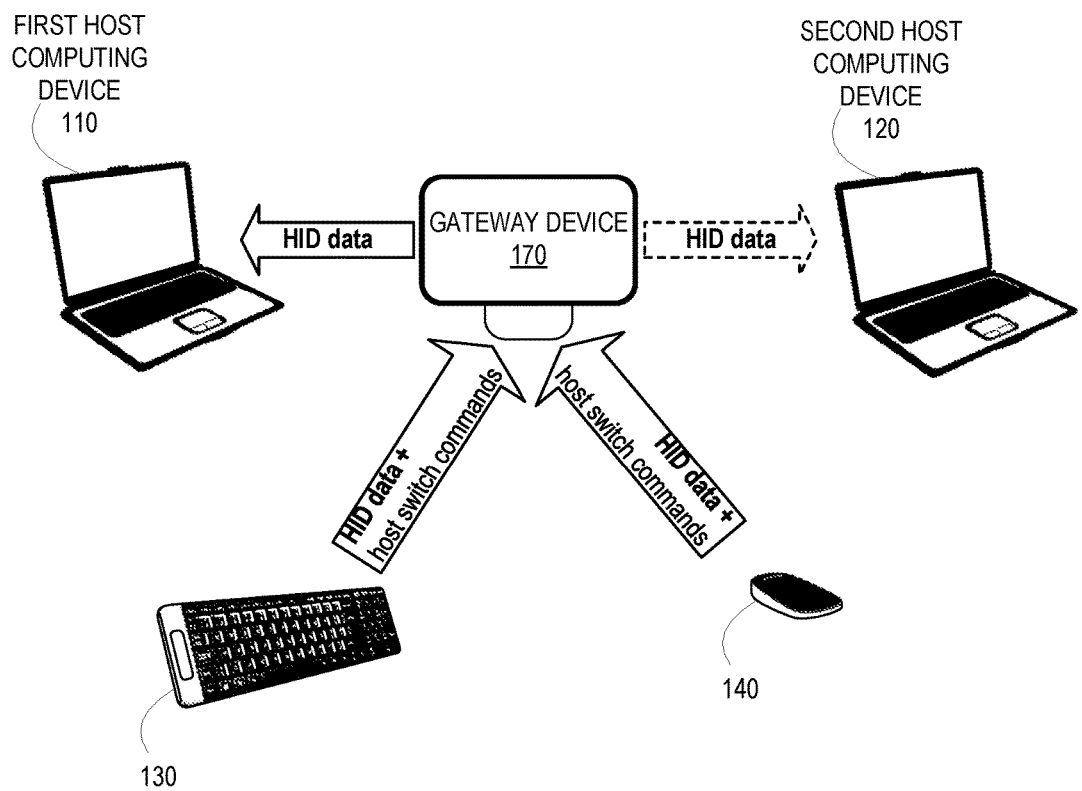
FIG. 2 is a diagram of a computer system according to an additional embodiment of the present invention.

FIG. 2 is a diagram of a computer system 200 according to an additional embodiment of the present invention. In the embodiment shown in FIG. 2, the first host computing device 110, the second host computing device 120, the keyboard device 130, and the mouse input device 140 may all be connected to a gateway device 170. The gateway device 170 may be located on one of the host computing devices (e.g., a dongle device) or may be a standalone device (e.g., a central hub). The gateway device 170 may receive and send communications between all the devices connected to the gateway device 170. The first host computing device 110, the second host computing device 120, the keyboard device 130, and the mouse input device 140 may all be connected to the gateway device 170 through wireless connections. In such embodiments, the first host computing device 110, the second host computing device 120, the keyboard device 130, and the mouse input device 140 may not be directly connected or paired with each other. In some embodiments, the wireless connections between the devices and the gateway device 170 may be Bluetooth® connections or any other appropriate communications protocol.

In embodiments of the invention using the computer system 200 of FIG. 2, the gateway device 170 may be used as a proxy to relay data and commands from the keyboard device 130 to the mouse input device 140, and vice versa. For example, the mouse input device 140 may send HID data to the gateway device 170, which may then be transmitted to the currently paired host computing device. In addition, switching commands may be sent between the keyboard device 130 and the mouse input device 140 via the gateway device 170 to effect switching the keyboard device 130 and the mouse input device 140 between host computing devices. In such embodiments, a wireless connection directly between the keyboard device 130 and the mouse input device 140 may not be required.

II. Exemplary Methods

A. Software on Host Embodiment

Figure 3:
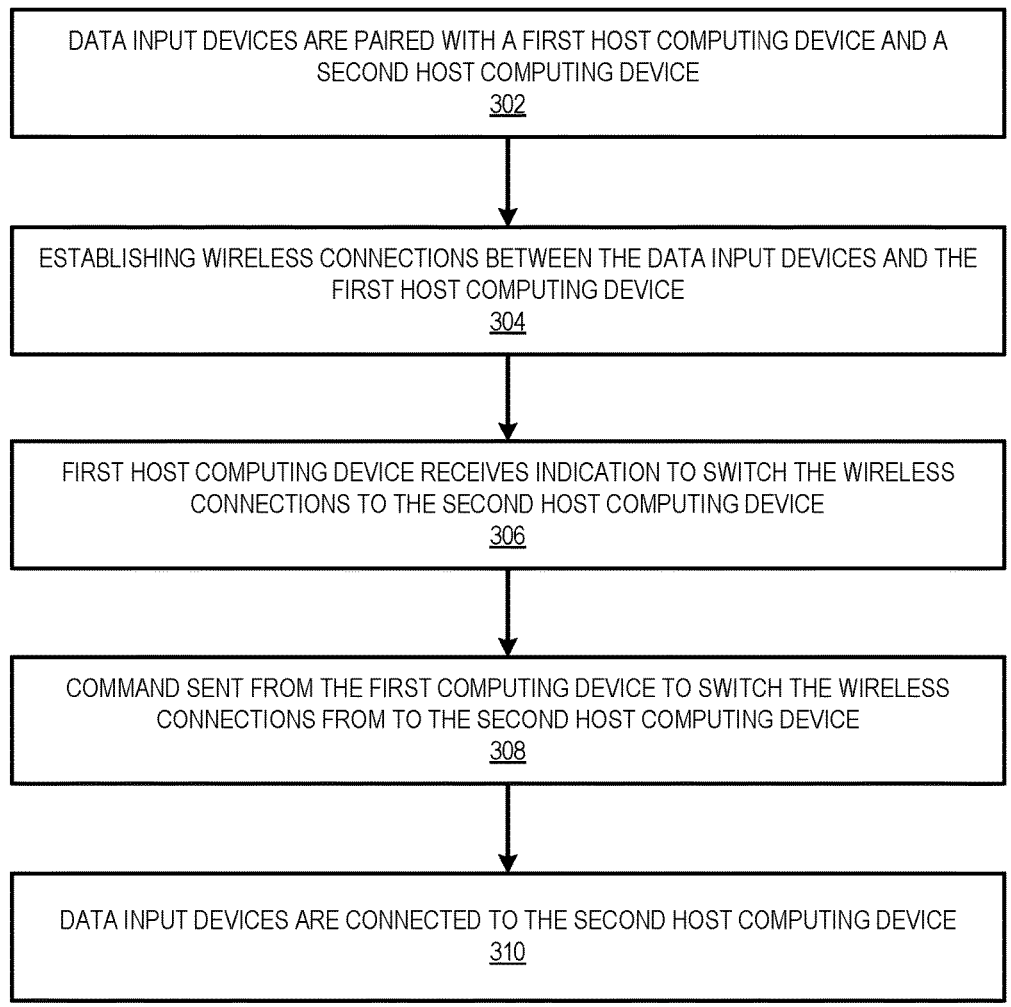
FIGS. 3-5 are flowcharts describing the process for switching multiple input devices between host computing devices.
Figure 6:
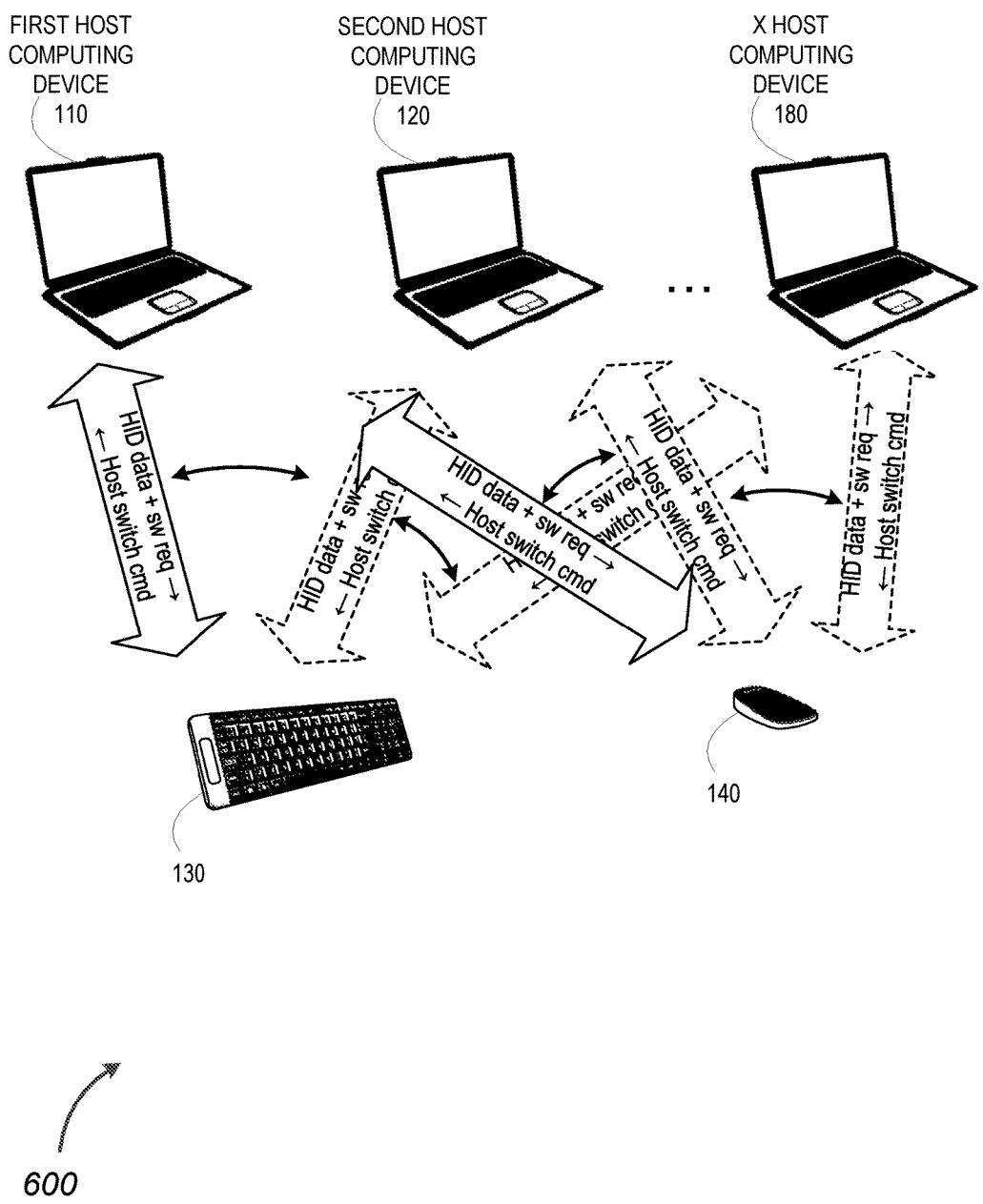
FIG. 6 is an alternative diagram of a computer system according to an embodiment of the present invention with switching software on the host.

FIG. 3 is a flowchart diagram for switching multiple input devices between host computing devices. In the embodiment described in FIG. 3, software to facilitate the switching process is installed on the host computing devices. Embodiments of the present invention are described with two host computing devices. However, embodiments of the present invention contemplate the use of more than two host computing devices, as illustrated in FIG. 6, where the keyboard input device 130 and the mouse input device 140 can be switched from the first host computing device 110 to the second host computing device 120, and to the X host computing device 180.

In step 302, the data input devices 130 and 140 are paired with a first host computing device 110 and a second host computing device 120. In such embodiments, the data input devices 130 and 140 may be paired to the first host computing device 110 through a standard wireless pairing process (e.g., a Bluetooth® discovery and connection process). Similarly, the data input devices 130 and 140 may be paired to the second host computing device 120 through the standard wireless pairing process.

In some embodiments, an I/O and communications block in the mouse input device 140 may be configured to establish a connection between the mouse input device 140 and the first host computing device 110. In some embodiments, the pairing process may be utilized to establish a wireless connection between the mouse input device 140 and the first host computing device 110. In some embodiments, the wireless connection can be Bluetooth®, Bluetooth® Smart (or Bluetooth® Low Energy), or any other wireless standard or proprietary wireless network protocol.

In some embodiments, the user may be required to interact with the first host computing device 110 to initiate a connection between the first host computing device 110 and the mouse input device 140. For example, the user may have to input a code into the first host computing device 110 to confirm that the user wants to pair the mouse input device 140 with the first host computing device 110. In other embodiments, the user may be required to access settings in the first host computing device 110 and select the mouse input device 140 from a list of available or discoverable input devices. In other embodiments, the user does not have to interact with the first host computing device 110 to initiate the connection with the mouse input device 140, and the connecting and pairing process may be completed automatically. Similar steps and processes may also be required to establish a connection between the mouse input device 140 and the second host computing device 120, as well as between the keyboard device 130 with both the first host computing device 110 and the second host computing device 120.

In step 304, wireless connections 150a and 160a are established between the first host computing device 110 and the data input devices 130 and 140. After the data input devices 130 and 140 have been through a pairing process with the first host computing device 110 and the second host computing device 120, the keyboard device 130 may be connected with the first host computing device 110 by a wireless connection 150a, and the mouse input device 140 may be connected with the first host computing device 120 by a wireless connection 160a, such that data inputs (e.g., HID data) may be sent from the data input devices 130 and 140 to the first host computing device 110 based on user interactions with the data input devices 130 and 140 (e.g., keystroke selection on the keyboard device 130 and/or mouse movements/selections on the mouse input device 140).

In step 306, the first host computing device 110 receives an indication to switch the wireless connections 150a and 160a from the first host computing device 110 to the second host computing device 120. The indication received by the first host computing device 110 may be internal or external to the first host computing device 110.

In some embodiments, an internal indication may include a movement of a cursor associated with the mouse input device to a designated region of a computer display of the first host computing device 110. Additional internal indications may include moving the cursor associated with the mouse input device off the computer display of the first host computing device 110. In such embodiments, the internal indications may be detected by the software installed on the first host computing device 110.

In some embodiments, external indicators may include the movement or selection of a switch, button, toggle or other similar input element by the user on either the keyboard device 130 or the mouse input device 140. Other external indicators may include a pre-designated change in the orientation of the keyboard device 130 or the mouse input device 140 (e.g., orienting the keyboard from facing the first host device to facing the second host device). Other external indicators may include a pre-designated gesture that may be detected by a sensor or receiver device (e.g., a movement of the user's body orientation to the desired host computing device, a motion to point to the desired host computing device to which the data input devices are not currently connected with). Additional external indicators may include tactile contact or visual movement of the user that may be detected by a sensor or receiver device. For example, the user may shift her visual contact from the first host computing device 110 to the second host computing device 120 in order to initiate the switching of the data input device 130 and 140. A sensor device configured to register the eye movement of the user may detect the movement of the user's eye from the first host computing device 110 to the second host computing device 120. The detected movement of the user's eye may provide an indication that the connections of the keyboard device 130 and the mouse input device should be switched to the second host computing device 120.

In step 308, a command is sent from the first host computing device 110 to switch the wireless connections 150a and 160a with the data input devices 130 and 140, respectively, from the first host computing device 110 to the second host computing device 120.

In step 310, the data input devices 130 and 140 are connected to the second host computing device 120 by wireless connections 150b and 160b.

It should be appreciated that the specific steps illustrated in FIG. 3 provide a particular method 300 according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8A:
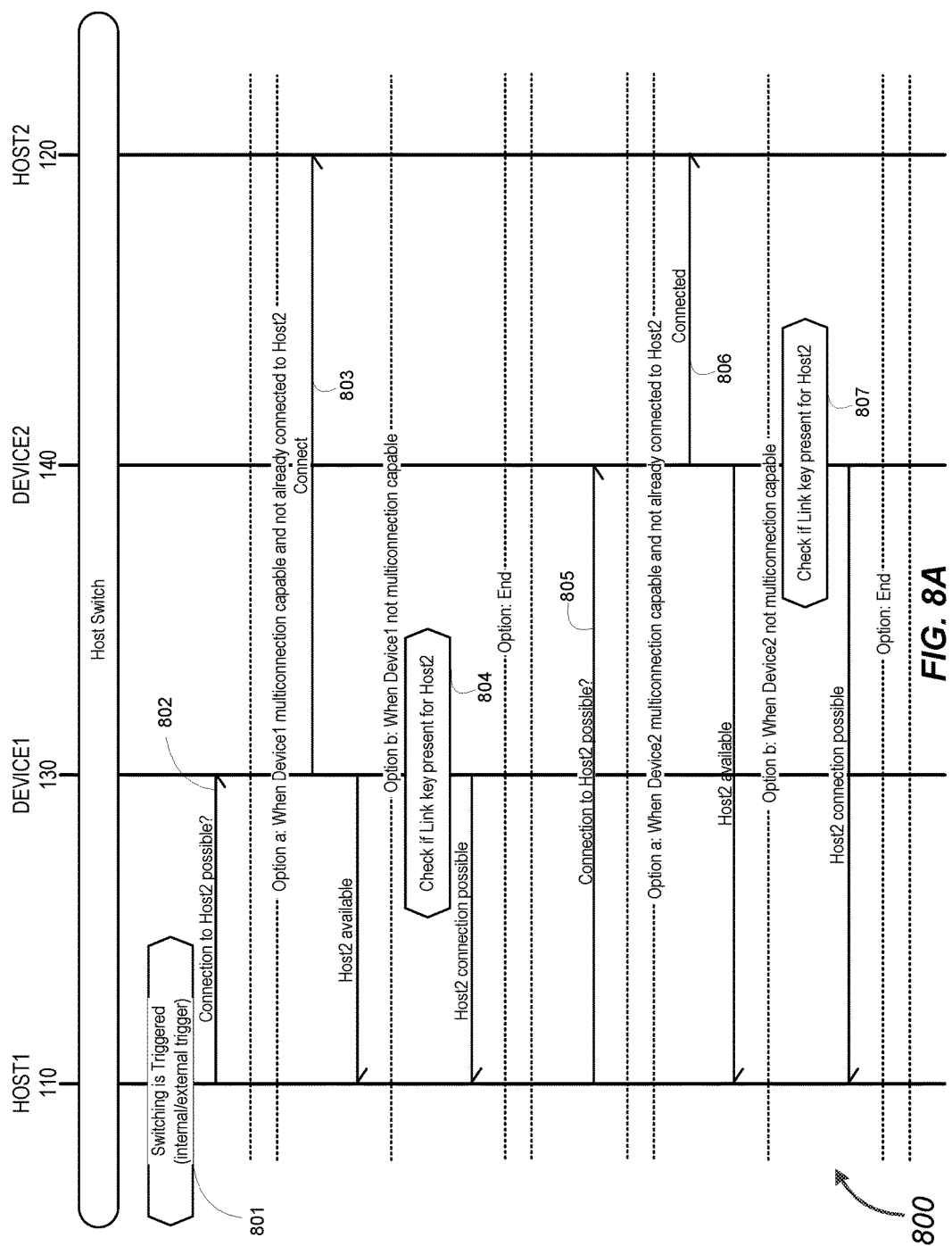
FIGS. 8A-8C depict a flow diagram illustrating the sequences of commands between multiple input devices and multiple hosts according to embodiments of the present invention.
Figure 8B:
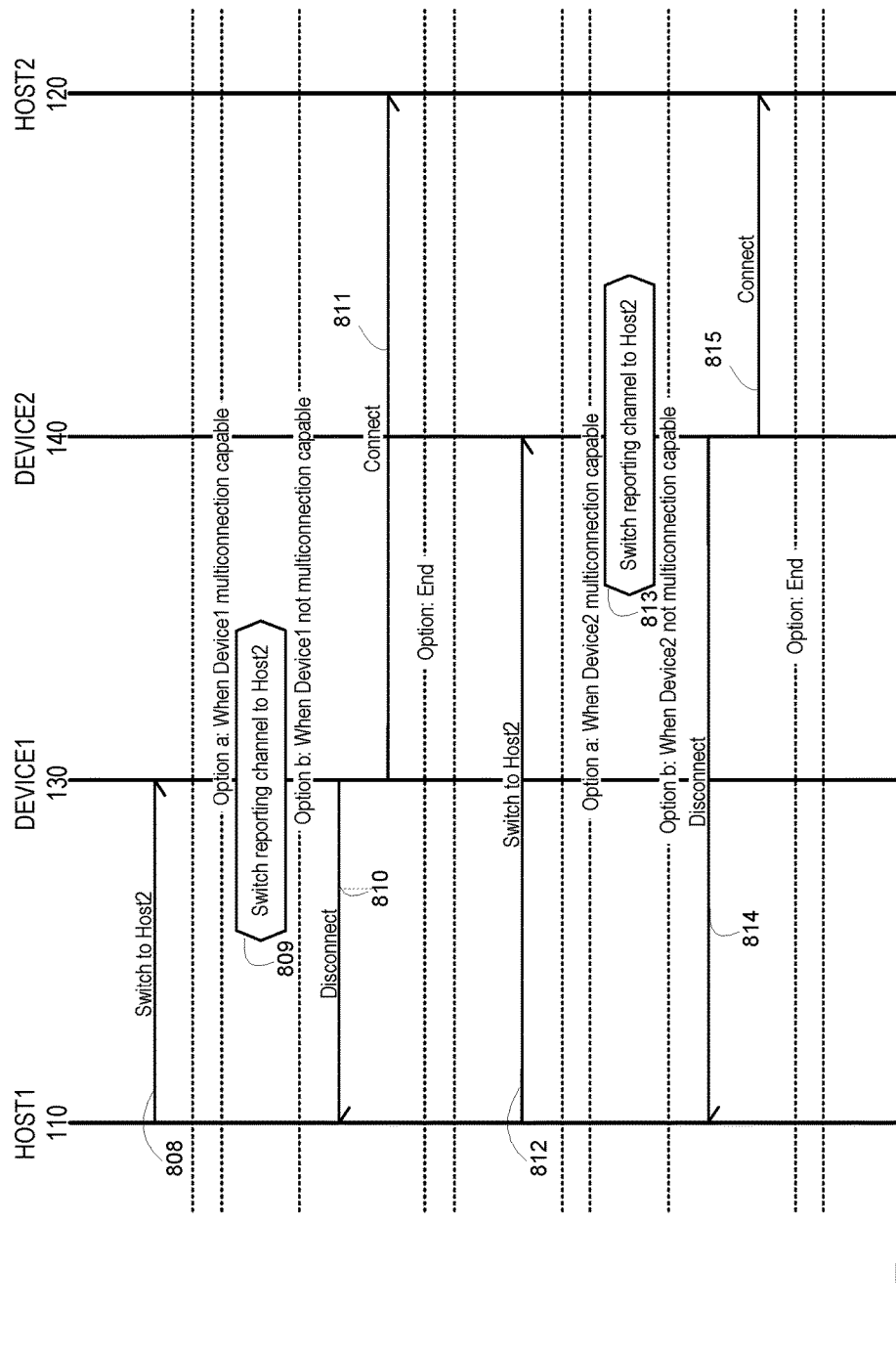
Figure 8C:
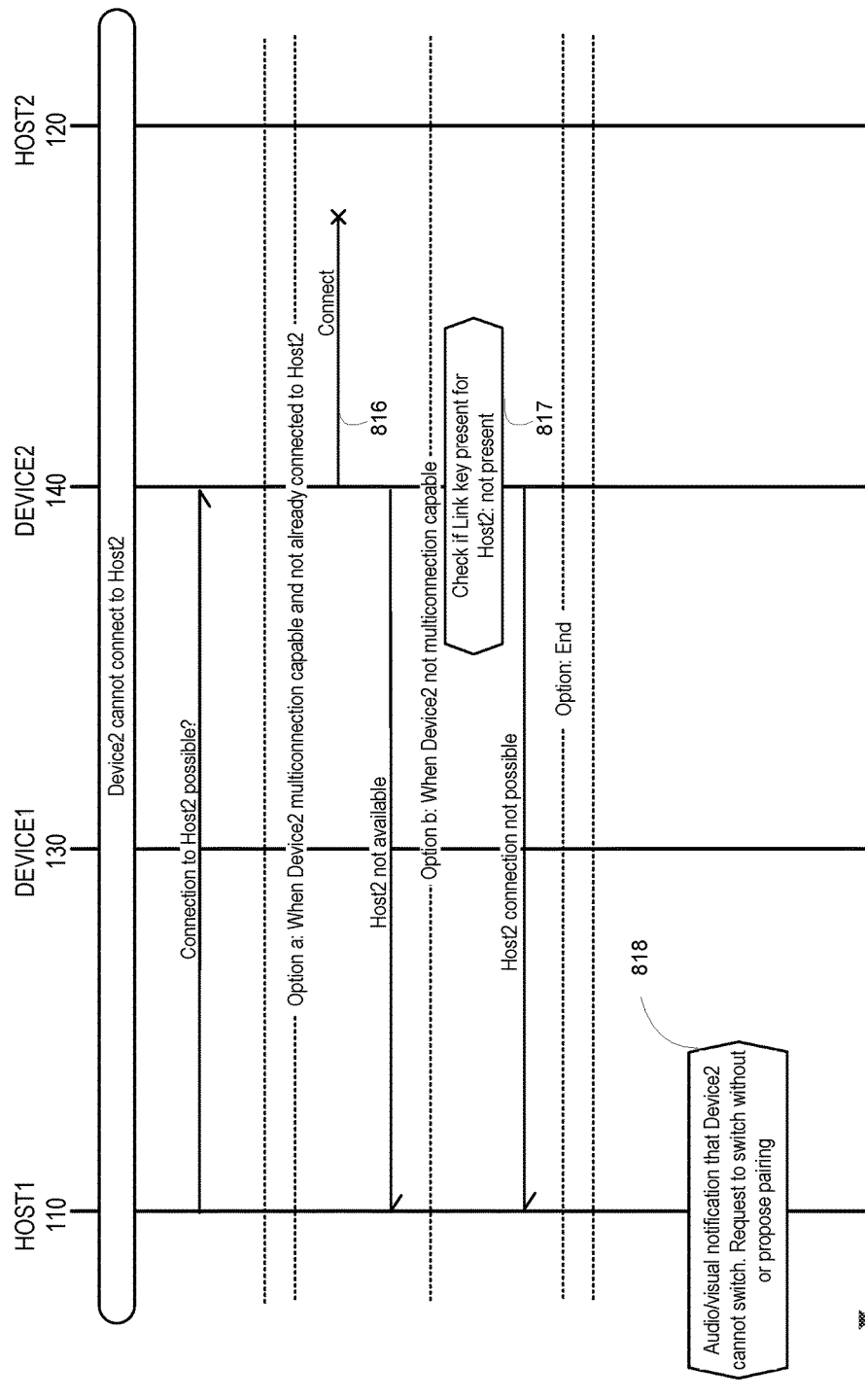

FIGS. 8A-8C depict a flow diagram illustrating the sequences of commands between multiple input devices and multiple hosts according to embodiments of the present invention. The first host computing device 110 receives an indication that a switching process has been triggered, either internally or externally to the first host computer device (Step 801). In embodiments of the present invention, the first host computing device 110 may determine whether the connection to the second host computing device 120 by the first data input device 130 is possible (Step 802). The first host computing device 110 may also determine whether the connection to the second host computing device 120 by the second data input device 140 is possible (Step 805).

In some embodiments, when a first data input device 130 is multi-connection capable (e.g., the data input device can maintain two or more connections to host computing devices simultaneously), and is not already connected to the second host computing device 120, the software on the first host computing device 110 may send a command to the first data input device 130 instructing the first data input device 130 to attempt to connect to the second host computing device 120 (step 803). In such embodiments, when the second data input device 140 is multi-connection capable, the first host computing device 110 may also send a command to the second data input device 140 instructing the second data input device 140 to attempt to connect to the second host computing device 120. The data input devices 130 and 140 may send a response to the first host computing device 110 indicating that the connection to the second host computing device 120 is possible.

In embodiments of the present invention, where the first data input device 130 is multi-connection capable and is already connected to the second host computing device 120, the first data input device may be switched to the second host computing device 120 with little or no latency (e.g., delay in the transition from the first host computing device 110 to the second host computing device 120). In other embodiments, the first host computing device 110 may send an instruction to the data input devices 130 and 140 to switch to the second host computing device 120 (Steps 808 and 812). The first data input device may switch a reporting channel from the first host computing device 110 to the second host computing device 120 (step 809), and the second data input device may switch a reporting channel from the first host computing device 110 to the second host computing device 120 (step 813).

In embodiments of the present invention, where the first data input device 130 is not multi-connection capable, the first host computing device 110 may determine whether a link key is present for the second host computing device 120 (Step 804). In embodiments of the present invention, the link key may include the address of the host computing devices for which the data input device has pairing data (e.g., a pairing profile) and any encryption data required for the connection. When the link key is present for the second host computing device 120, the first host computing device 110 may send a command to the first data input device 130 to connect to the second host computing device 120 (step 808). A similar operation may be performed when the second data input device 140 is not multi-connection capable (Step 807). The first data input device 130 and the second data input device 140 may disconnect from the first host computing device 110 (steps 810 and 814, respectively), and then connect to the second host computing device 120 (steps 811 and 815, respectively).

In some embodiments, the first data input device 130 may be multi-connection capable, and the second data input device 140 may not be multi-connection capable. In other embodiments, both data input devices 130 and 140 may not be multi-connection capable.

When both of the data input devices 130 and 140 are not multi-connection capable, but have pairing information for the second host computing device 120 (through a previous pairing process as described in step 302), the connection between the data input devices 130 and 140 and the first host computing device 110 may be disconnected and the data input devices 130 and 140 may then connected to the second host computing device 120.

When both of the data input devices 130 and 140 are not multi-connection capable and do not have pairing information for the second host computing device 120, the data input devices 130 and 140 may remain connected to the first host computing device 110. In such situations, since the data input devices 130 and 140 do not have pairing information for the second host computing device 120, they will not be able to connect successfully to the second host computing device 120.

In some embodiments, one of the data input devices may not be able to switch the connection from the first host computing device 110 to the second host computing device 120. In some embodiments, where the data input device is multi-connection capable, the data input device may not successfully connect to the second host computing device 120 (Step 816). In some embodiments, where one of the data input devices is not multi-connection capable, the data input device may not successfully connect to the second host computing device 120 because a link key is not present (Step 817). In situations where the switching process cannot be completely, a notification may be provided indicating that the data input device cannot switch (Step 818). The notification may be auditory or visual. In such embodiments, the user may be prompted to approve switching data input devices that can successfully switch to the first host computing device 110, while data input devices that cannot switch maintain the connection to the first host computing device 110.

In some embodiments, the first host computing device 110 may determine whether the first data input device 130 and the second data input device 140 are capable of connecting to the second host computing device 120. In such embodiments, the first host computing device 110 may determine whether a pairing profile exists for a wireless connection between the second host computing device 120 and the first data input device 130, and whether a pairing profile exists for a wireless connection between the second host computing device 120 and the second data input device 140. In some embodiments, the pairing profile may have been generated during a previous connecting and pairing process.

As a result of the determination that the first data input device 130 and the second data input device 140 are capable of connecting to the second host computing device 120, a connection may be initiated between the first data input device 130 and the second data input device 140 with the second host computing device 120.

It should be appreciated that the specific steps illustrated in FIG. 8 provide a particular method 800 according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

B. No Software on Host Embodiment

Figure 4:
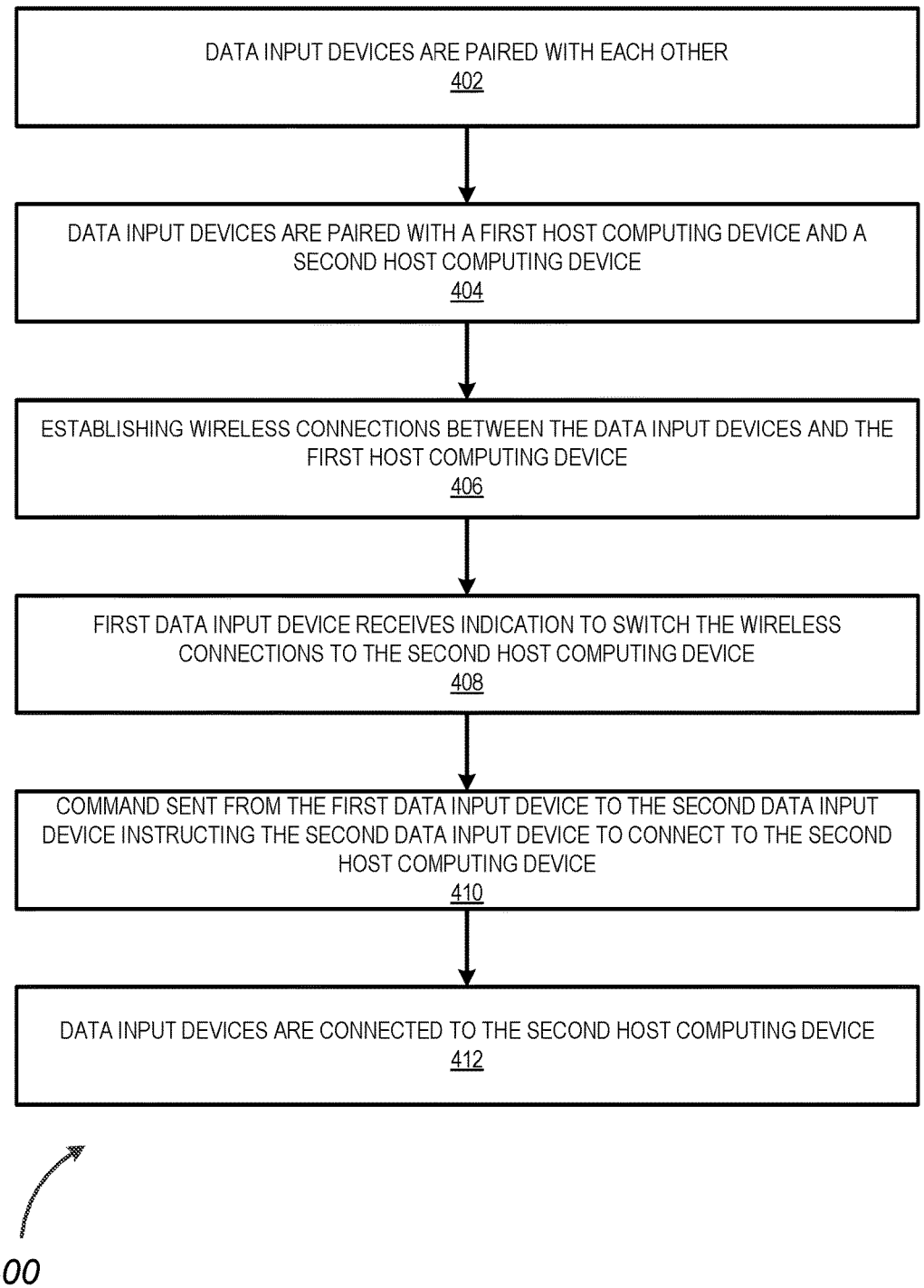
Figure 7:
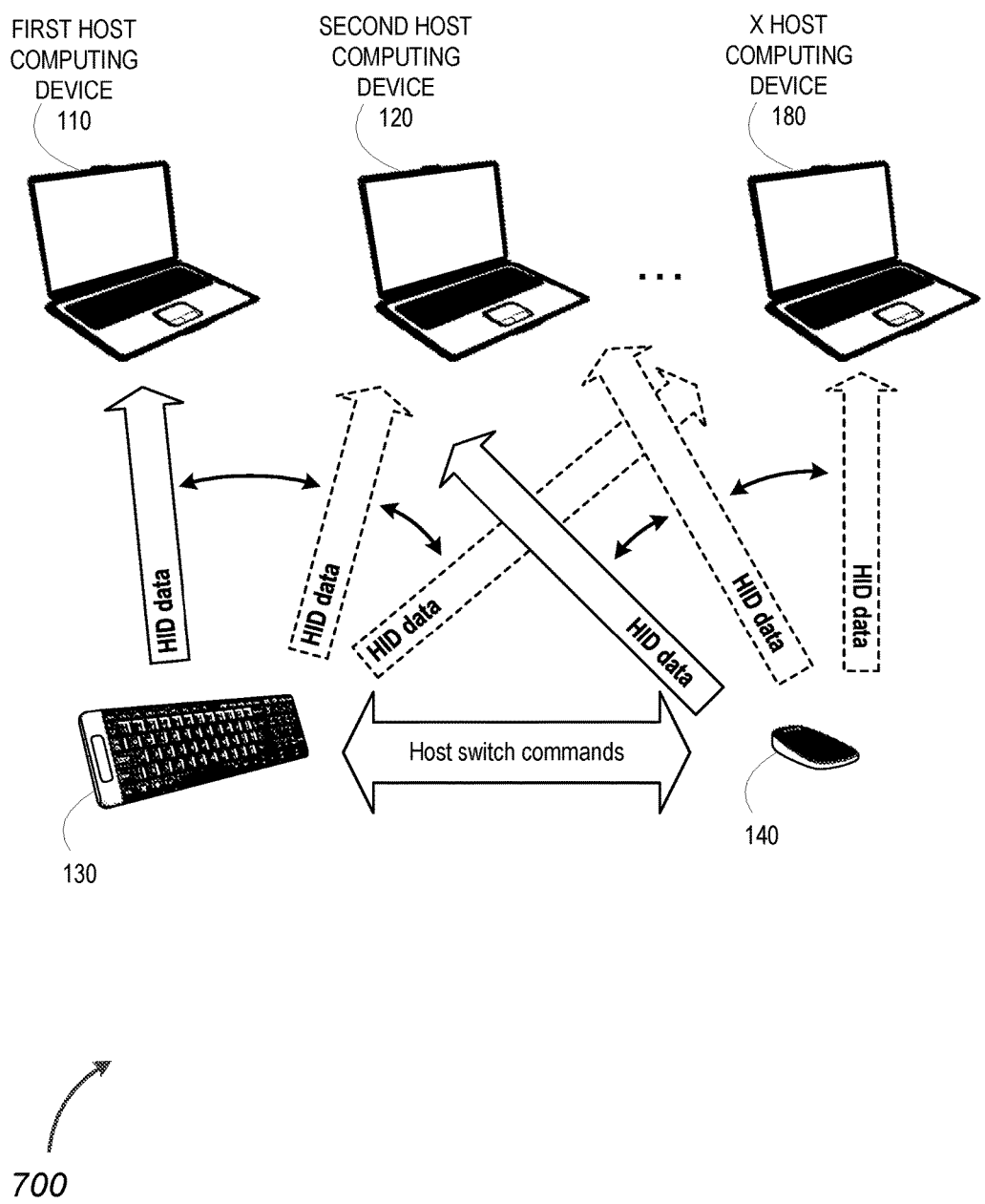
FIG. 7 is an alternative diagram of a computer system according to an embodiment of the present invention without switching software on the host.

FIG. 4 is a flowchart diagram for switching multiple input devices between host computing devices. In the embodiment described in FIG. 4, no software to facilitate the switching process is installed on the host computing devices. This is also illustrated in FIG. 7, where the keyboard input device 130 and the mouse input device 140 send host switching commands directly between the two devices for switching from the first host computing device 110 to the second host computing device 120, and to the X host computing device 180.

In the embodiments described with respect to FIG. 4, the data input devices 130 and 140 have a multi-connection capability. For example, the keyboard device 130 may be able to maintain a connection with the mouse input device 140 and the first host computing device 110 simultaneously. In such embodiments, through the wireless connection between the data input devices 130 and 140, each data input device can send commands (e.g., wireless connection switching commands) to the other data input devices to which it is paired by the wireless connection.

In step 402, the data input devices 130 and 140 are paired each other. In some embodiments, the data input devices 130 and 140 may be factory pre-paired into a group of devices. The embodiment described with respect to FIG. 4 describes the group of devices including two data input devices. In other embodiments, the group of devices may include more than two data input devices. In other embodiments, the data input devices 130 and 140 may be automatically paired when the data input devices 130 and 140 come within a predetermined proximity of each other. For example, when a keyboard device 130 and a mouse input device 140 are placed within a range of each other (e.g., less than eight inches apart), the keyboard device 130 and the mouse input device 140 may be automatically paired into a group.

In other embodiments, the group of devices may be defined using software installed on the first host computing device 130 and/or the second host computing device 140. For example, the user may pair a plurality of data input devices with the first host computing device 130. The user may then select a subset of the plurality of data input devices and associate them as a first group. The user may then select a different subset to form a second group. The data for the different groupings may be stored in a memory component of the data input devices in pairing profiles.

In step 404, the data input devices 130 and 140 are paired with a first host computing device 110 and a second host computing device 120. The process of pairing the data input devices with the host computing devices is similar as that described with respect to step 302 above.

In step 406, wireless connections 150a and 160a are established between the first host computing device 110 and the data input devices 130 and 140. After the data input devices 130 and 140 have been through a pairing process with the first host computing device 110 and the second host computing device 120, the data input device 130 and 140 may be connected with the first host computing device 110 by wireless connections 150a and 160a such that data input (e.g., HID data) may be sent from the data input devices 130 and 140 to the first host computing device 110 based on user interactions with the data input devices 130 and 140.

In step 408, the first data input device 130 receives an indication to switch the wireless connections 150a and 160a to the second host computing device 120. The indicator may be an external indicator triggered on the first data input device by the user. Such external indicators may include the movement of a switch, button, toggle or other similar input element by the user on either the keyboard device 130 or the mouse input device 140. Other external indicators may include a pre-designated change in the orientation of the keyboard device 130 or the mouse input device 140, or a gesture, tactile contact or visual movement of the user that may detected by a sensor or receiver device.

In step 410, a command is sent from the first data input device 130 to the second data input device 140 instructing the second data input device 140 to connect to the second host computing device 120. In embodiments of the present invention, using the paired connection between the first data input device 130 and the second data input device 140, the first data input device 130 sends a switch command to the second data input device 140. In embodiments where there are more than two devices in the pre-paired group of devices, the first data input device 130 may send the switch command to all data input devices in the group of devices.

In step 412, the data input devices 130 and 140 are connected to the second host computing device 120 by wireless connections 150b and 160b.

It should be appreciated that the specific steps illustrated in FIG. 4 provide a particular method 400 according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9A:
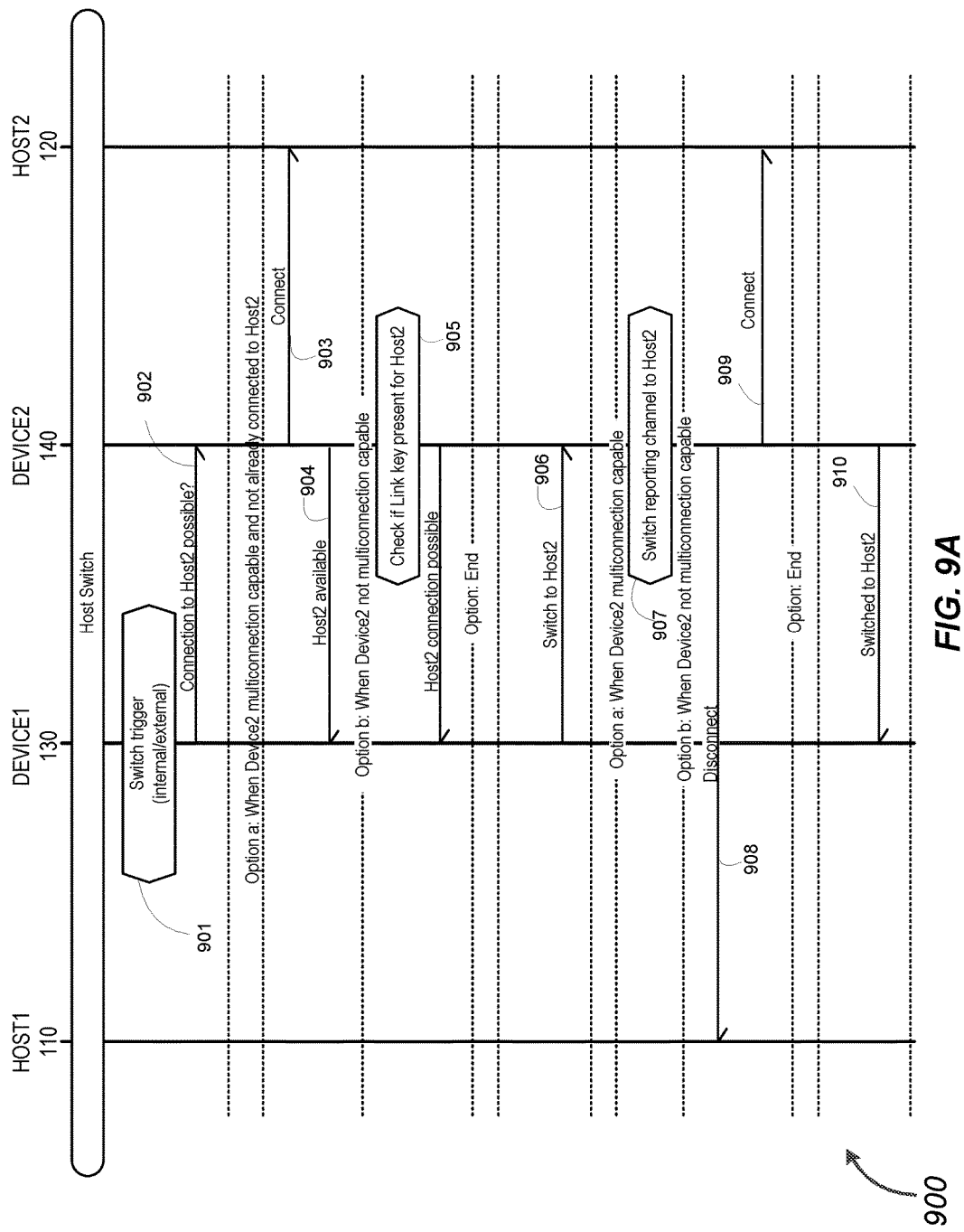
FIGS. 9A-9B depict a flow diagram illustrating the sequences of commands between multiple input devices and multiple hosts according to embodiments of the present invention.
Figure 9B:
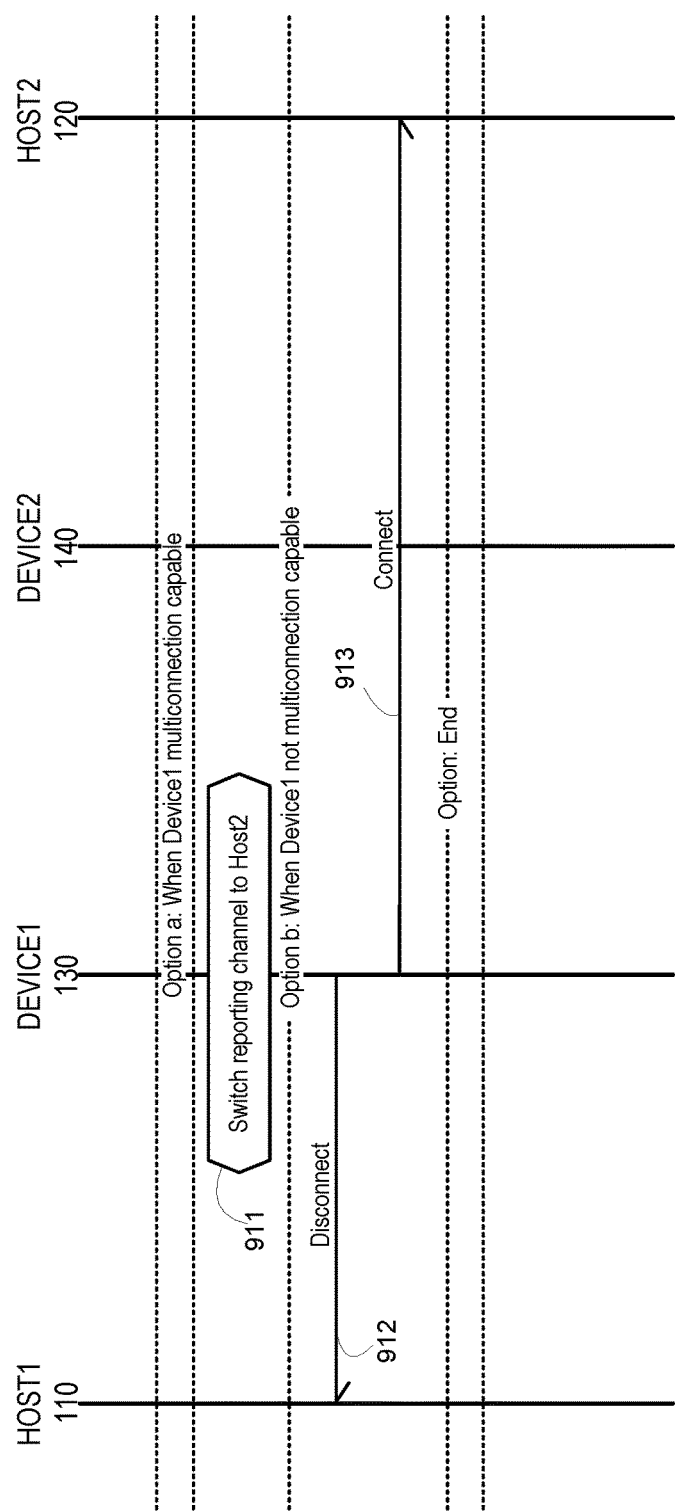

FIGS. 9A-9B depict a flow diagram illustrating the sequences of commands between multiple input devices and multiple hosts according to embodiments of the present invention. In this embodiment, the first data input device 130 receives an indication that a switching process has been triggered, either internally or externally to the first data input device 130 (Step 901). In embodiments of the present invention, the first data input device 130 may determine whether a connection to the second host computing device 120 by the second data input device 140 is possible (Step 902).

In some embodiments, when a second data input device 140 is multi-connection capable (e.g., the data input device can maintain two or more connections to host computing devices simultaneously), and is not already connected to the second host computing device 120, first data input device 130 may send a command to the second data input device 140 instructing the second data input device 140 to attempt to connect to the second host computing device 120 (step 903). The second data input device 140 may send a response to the first data input device 130 indicating that the connection to the second host computing device 120 is possible. Where the second data input device 140 is multi-connection capable, the first data input device 130 may send a command to the second data input device 140 to connect to the second host computing device 120 (step 906). The second data input device 140 may switch a reporting channel from the first host computing device 110 to the second host computing device 120 (step 907).

In embodiments of the present invention, where the second data input device 140 is not multi-connection capable, the first data input device 130 may determine whether a link key is present for the second host computing device 120 (Step 905). In embodiments of the present invention, the link key may include the address of the host computing devices for which the data input device has pairing data (e.g., a pairing profile) and any encryption data required for the connection. When the link key is present for the second host computing device 120, the first data input device 130 may send a command to the second data input device 140 to connect to the second host computing device 120 (step 906). The second data input device 140 may disconnect from the first host computing device 110 (step 908), and then connect to the second host computing device 120 (step 909).

When the second data input device 140 has successfully switched from the first host computing device 110 to the second host computing device 120, the second data input device 140 may send a notification message indicating such to the first data input device 130 (step 910).

Once the second data input device 140 has switched to the second host computing device 120, the first data input device 130 may proceed to switch to the second host computing device 120. In embodiments where the first data input device 130 is multi-connection capable, the first data input device 130 may switch a reporting channel from the first host computing device 110 to the second host computing device 120 (step 911). In embodiments of the present invention where the first data input device 130 is not multi-connection capable, the first data input device 130 may disconnect from the first host computing device 110 (step 912), and then connect to the second host computing device 120 (step 913).

In some embodiments, one of the data input devices may not be able to switch the connection from the first host computing device 110 to the second host computing device. In some embodiments, where the data input device is multi-connection capable, the data input device may not successfully connect to the second host computing device. In some embodiments, where one of the data input devices is not multi-connection capable, the data input device may not successfully connect to the second host computing device because a link key is not present. In situations where the switching process cannot be completed successfully, a notification may be provided indicating that the data input device cannot switch. In some embodiments, the data input device that cannot switch may provide the notification to the user. In other embodiments, the data input device that successfully switched may provide the notification to the user. The notification may be auditory or visual.

It should be appreciated that the specific steps illustrated in FIG. 9 provide a particular method 900 according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

C. Gateway Device Embodiment

Figure 5:
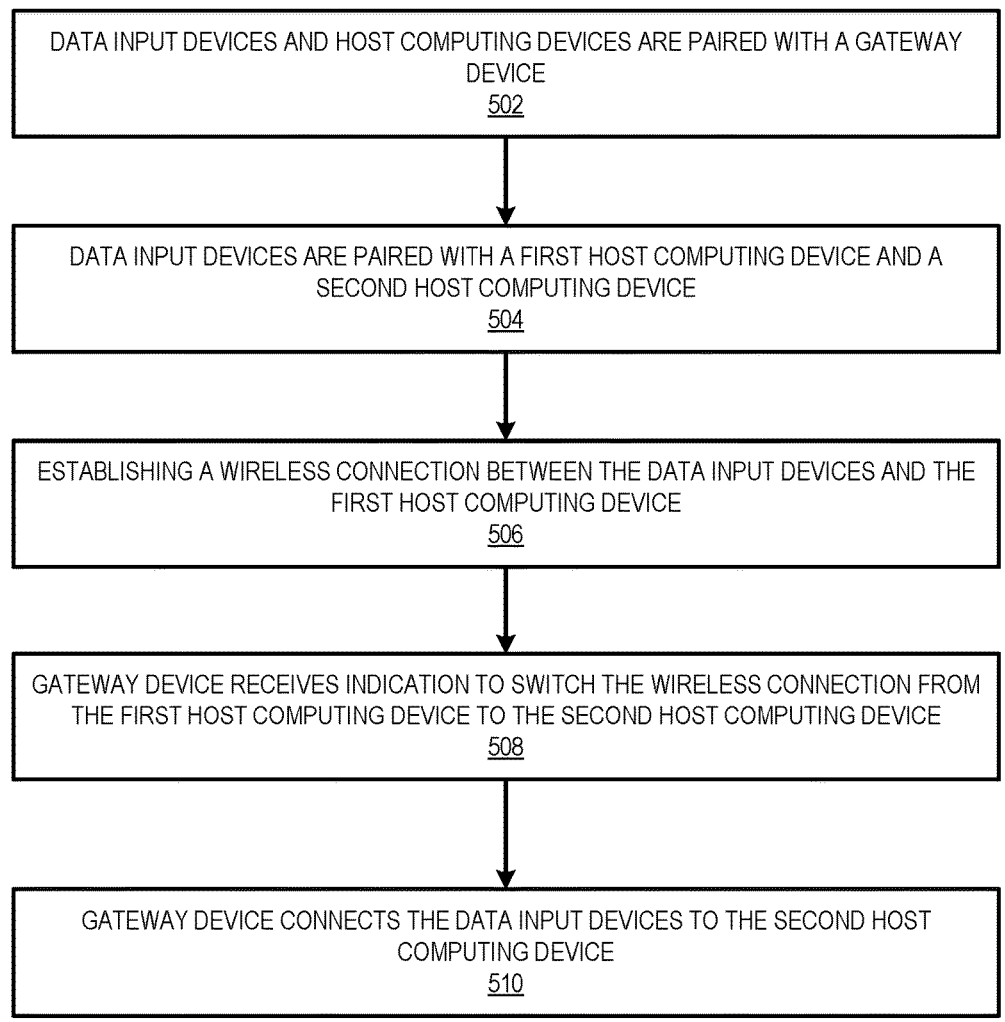

FIG. 5 is a flowchart diagram for switching multiple input devices between host computing devices. In the embodiment described in FIG. 5, a gateway device 170 may be used to facilitate communications between devices. This is also illustrated in FIG. 2.

In step 502, the data input devices 130 and 140 and the host computing devices 110 and 120 may be paired with a gateway device 170. The gateway device 170 may be a dongle using a 2.4 GHz proprietary protocol that may connect with a plurality of data input devices and host computing devices simultaneously. Each connection to the gateway device 170 may be a wireless connection. In some embodiments, the wireless connections can be Bluetooth®, Bluetooth LE (Low Energy, known as Bluetooth® Smart), or any other wireless standard or proprietary wireless network protocol. The process of pairing the data input devices 130 and 140 and the computing device 110 and 120 with the gateway device 170 may be similar to the process previously described with respect to step 302 of FIG. 3.

In step 504, the data input devices 130 and 140 are paired with a first host computing device 110 and a second host computing device 120. The process of pairing the data input devices 130 and 140 with the host computing devices may be similar as that described with respect to step 302 of FIG. 3. The process of pairing the devices may include determining the appropriate mapping of keystroke and mouse selections to the host computing devices 110 and 120.

In step 506, a wireless connection is established between the first host computing device 110 and the data input devices 130 and 140. After the data input devices 130 and 140 have been through a pairing process with the gateway device 170, the data input device 130 and 140 may be connected with the first host computing device 110 by a wireless connection through the gateway device 170. In such situation, data inputs based on user interactions with the data input devices 130 and 140 may be sent from the data input devices 130 and 140 to the first host computing device 110 through the gateway device 170.

In step 508, the gateway device 170 receives an indication to switch the wireless connection from the first host computing device 110 to the second host computing device 120. The indicator may be an external indicator triggered on the first data input device 130 by the user and detected by the gateway device 170. Such external indicators may include the movement of a switch, button, toggle or other similar input element by the user on either the keyboard device 130 or the mouse input device 140. A command may be sent from the first data input device 130 to the gateway device 170 to switch the connection from the first host computing device 110 to the second host computing device 120. In embodiments of the present invention, the gateway device 170 may receive the command from the first data input device 130. In such embodiments, the gateway device 170 may modify its configuration to send commands received from the first data input device 130 and the second data input device 140 from the first host computing device 110 to the second host computing device 120.

In step 510, the gateway device 170 connects the first data input device 130 and the second data input device 140 to the second host computing device 120. Once the wireless connection has been switched to the second host computing device 120, the gateway device 170 may send HID data received from the data input devices 130 and 140 to the second host computing device 120 using the wireless connection from the gateway device 170 to the second host computing device 120.

It should be appreciated that the specific steps illustrated in FIG. 5 provide a particular method 500 according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
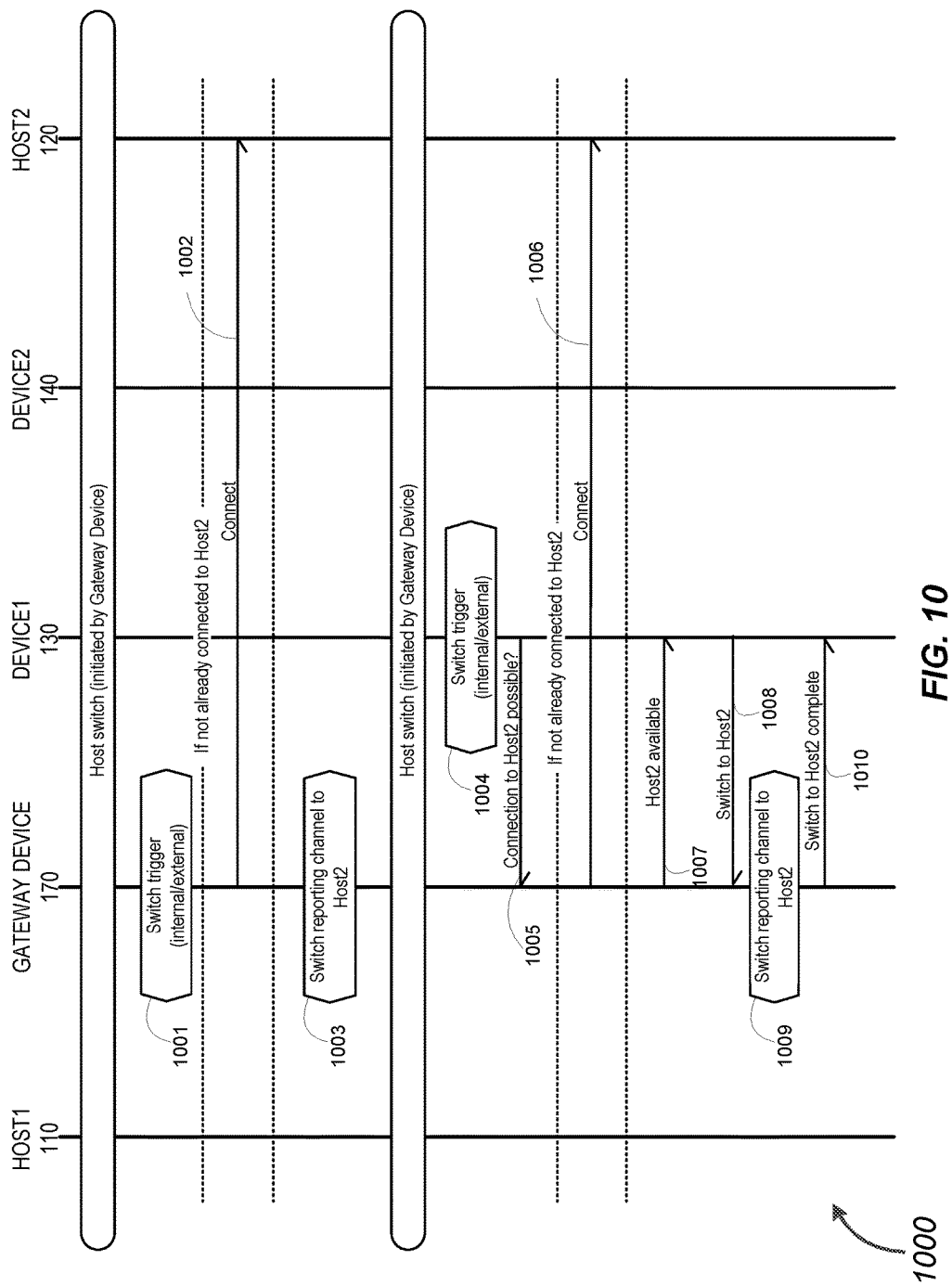
FIG. 10 depicts a flow diagram illustrating the sequences of commands between multiple input devices and multiple hosts according to embodiments of the present invention.

FIG. 10 depicts a flow diagram illustrating the sequences of commands between multiple input devices and multiple hosts according to embodiments of the present invention. In this embodiment, switching is initiated by a gateway device 170 that has been previously paired with the plurality of host computing devices (110 and 120) and the plurality of data input devices (130 and 140).

In some embodiments of the present invention, the gateway device 170 may receive an indication that a switching process has been triggered, either internally or externally (step 1001). In embodiments of the present invention, the gateway device 170 may determine whether a connection to the second host computing device 120 by the first data input device 130 is possible (step 1002). The gateway device 170 may then switch a reporting channel associated with the first data input device 130 from the first host computing device 110 to the second host computing device 120 (step 1003).

In other embodiments of the present invention, the indication that the switching process has been triggered, either internally or externally, may be detected by the first data input device 130 (step 1004). In such embodiments, the first data input device 130 may send a message to the gateway device 170 to check whether a connection to the second host computing device 120 is possible (step 1005). If the gateway device 170 is not connected to the second host computing device 120, the gateway device 170 may then connect to the second host computing device 120 (step 1006). The gateway device 170 may then provide an indication to the first data input device 130 that the connection to the second host computing device 120 is available (step 1007), the first data input device 130 may request that the switching be performed (step 1008). The gateway device 170 may switch a reporting channel associated with the first data input device 130 from the first host computing device 110 to the second host computing device 120 (step 907).

In some embodiments, a similar process may be performed with respect to the second data input device 140. In other embodiments, the request by the first data input device 130 to switch from to the second host computing device 120 may result in all data input devices paired to the gateway device being automatically switched to the second host computing device 120.

It should be appreciated that the specific steps illustrated in FIG. 10 provide a particular method 1000 according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teaching provided herein, a person of ordinary skill in the art will appreciate other ways and/or methods to implement the present invention.

In embodiments, any of the entities described herein may be embodied by a computer that performs any or all of the functions and steps disclosed.

It should be noted that any recitation of "an", "an" or "the" is intended to mean "one or more" unless specifically indicated to the contrary.

It is also understood that the examples and embodiments described herein are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A method comprising:
   establishing a first direct wireless connection between a first data input device and a first host computing device;
   receiving a command to switch the first wireless connection of the first data input device from the first host computing device to a second host computing device;
   in response to receiving the command:
      establishing a direct wireless connection between the first data input device and a second host computing device; and
      breaking the direct wireless connection between the first data input device and the first host computing device; and
   in response to the establishing a direct wireless connection between the first data input device and a second host computing device or breaking the direct wireless connection between the first data input device and the first host computing device:
      causing a second data input device to establish a direct wireless connection between the second data input device and the second host computing device and break an existing direct wireless connection between the second data input device and the first host computing device.

2. The method of claim 1 further comprising:
   sending an indication to the first host computing device that the first data input device:
      established the direct wireless connection between the first data input device and the second host computing device; or
      broke the direct wireless connection between the first data input device and the first host computing device,
      wherein the indication causes the first host computer to send a command to the second data input device that causes the second data input device to establish a direct wireless connection between the second data input device and the second host computing device and break an existing direct wireless connection between the second data input device and the first host computing device.

3. The method of claim 1 further comprising:
sending a command from the first data input device to the second data input device that causes the second data input device to establish a direct wireless connection between the second data input device and the second host computing device and break an existing direct wireless connection between the second data input device and the first host computing device.

4. The method of claim 3 wherein the first data input device and the second data input device are connected by a third wireless connection.

5. The method of claim 4 wherein the first data input device and the second data input device are configured to send switching commands to each other via the third wireless connection.

6. The method of claim 1 wherein the first and second data input devices are configured to maintain wireless connections with a plurality of host computing devices simultaneously.

7. The method of claim 1 wherein the wireless connections include a Bluetooth® communications protocol.

8. The method of claim 1 wherein the first data input device is a computer mouse and the second data input device is a keyboard.

9. The method of claim 1 wherein the command to switch the first wireless connection of the first data input device from the first host computing device to the second host computing device is generated in response to an input element on the first data input device being activated.

10. The method of claim 9 wherein the input element is one of a switch, button, or toggled element.

11. The method of claim 1 further comprising:
determining a predetermined location on a display of the first host computing device that is configured to be triggered by a cursor entering the predetermined location on the display; and receiving a user input from the first data input device that causes the cursor to enter the predetermined location; and in response to determining that the cursor has entered the predetermined location on the display: generating the command to switch the first wireless connection of the first data input device from the first host computing device to a second host computing device.

* * * * *